J. J. JONES.
MEASURING INSTRUMENT.
APPLICATION FILED MAY 11, 1908.
911,729.
Patented Feb. 9, 1909.
2 SHEETS—SHEET 1.
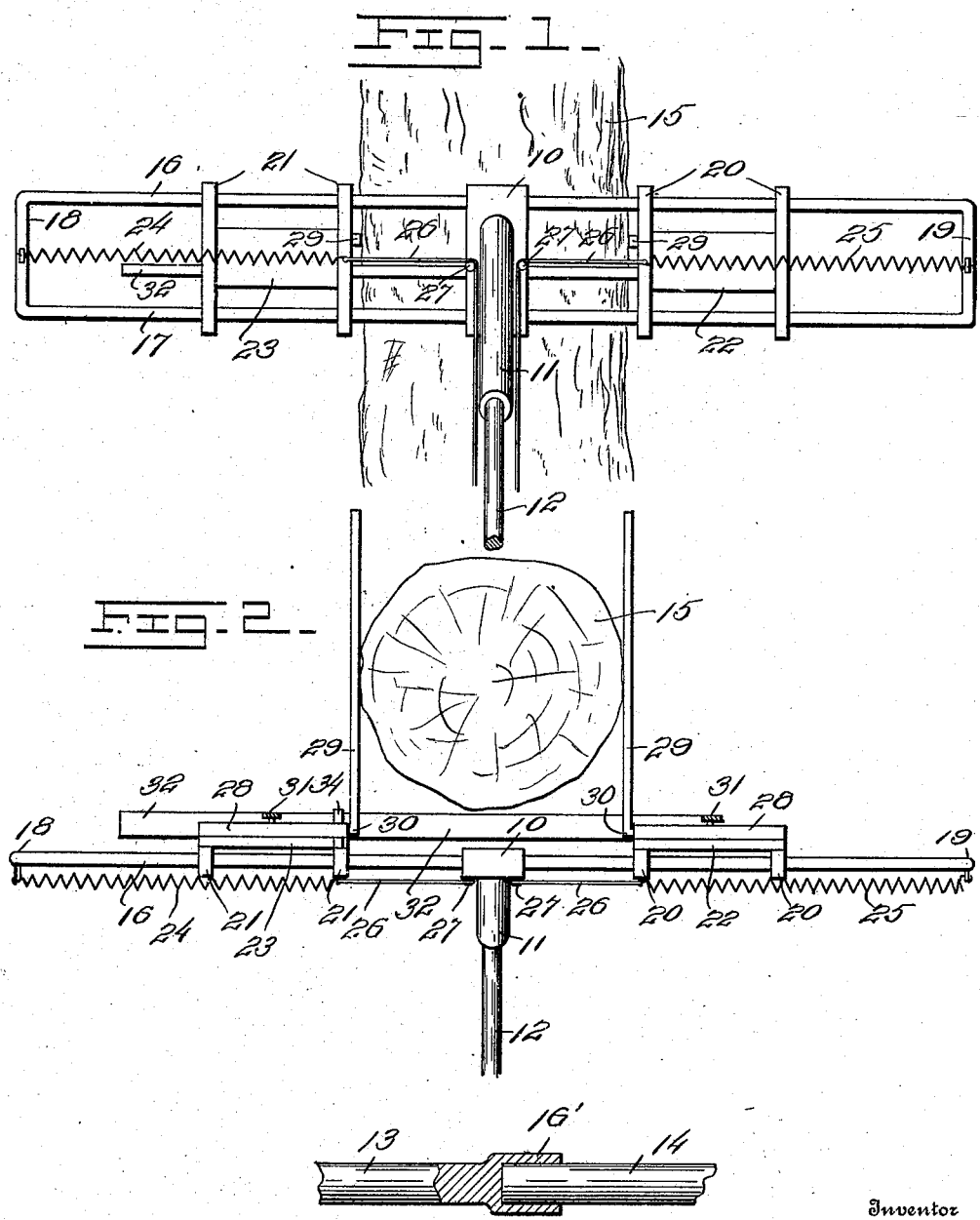

J. J. JONES.
MEASURING INSTRUMENT.
APPLICATION FILED MAY 11, 1908.
911,729.
Patented Feb. 9, 1909.
2 SHEETS—SHEET 2.
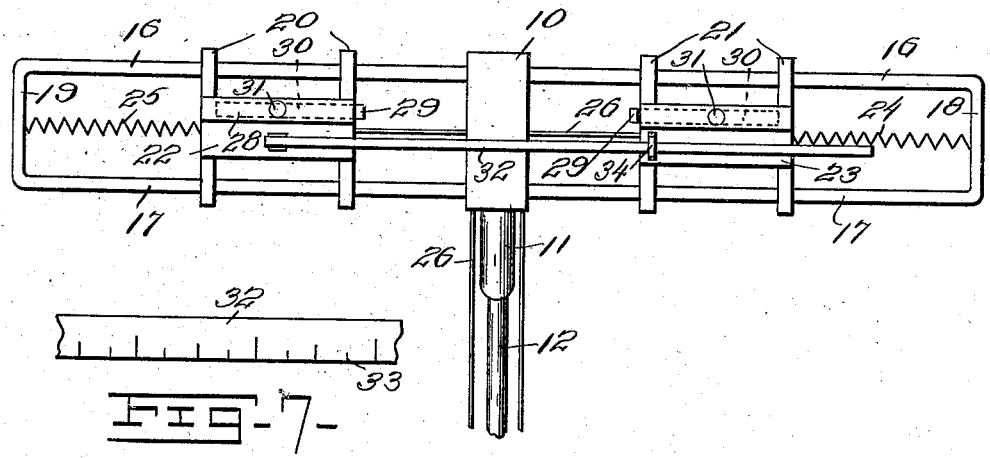
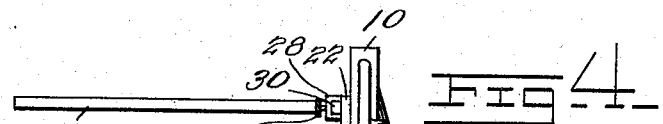
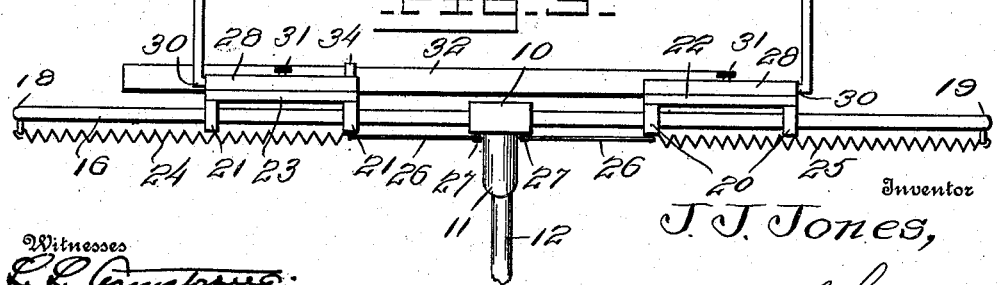

UNITED STATES PATENT OFFICE.

JOHN J. JONES, OF MOUNT VERNON, KENTUCKY, ASSIGNOR TO EDWARD JONES, OF VAIL, ARIZONA TERRITORY.

MEASURING INSTRUMENT.

No. 911,729.　　　　Specification of Letters Patent.　　　　Patented Feb. 9, 1909.

Application filed May 11, 1908. Serial No. 432,169.

*To all whom it may concern:*

Be it known that I, JOHN J. JONES, a citizen of the United States, residing at Mount Vernon, in the county of Rockcastle and State of Kentucky, have invented certain new and useful Improvements in Measuring Instruments, of which the following is a specification.

This invention relates to measuring instruments and especially refers to a device for measuring logs.

An object of this invention is to enable the measurement and approximate determination of the amount of valuable lumber in a tree before felling.

Another object of the invention is to provide a device that can be operated and applied by hand and also may be applied to the upper portion of a tree by a person standing upon the ground.

A further object of the invention is the provision of certain means by which the device may be applied to trees of various diameters so as to render the instrument applicable to all cases.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a rear elevation of the device as applied to a tree, Fig. 2 is a top plan view of the same, Fig. 3 is a front elevation of the device, Fig. 4 is an end elevation of the instrument, Fig. 5 is a top plan view of the device having the tree engaging arms reversed so as to apply to a tree of large diameter, Fig. 6 shows a fragmentary view of two sections of the handle and the method of joining the same, Fig. 7 is a fragmentary view of the scale employed.

Referring to the drawings, 10 designates a head having a sleeve portion 11 diagonally disposed upon the back face thereof for the reception of a handle 12. The handle 12 comprises sections 13, 14 etc., there being as many sections employed as is required in accordance with the height of the tree 15. The sections 13 and 14 are provided with enlarged lower ends 16' which are adapted to contain the upper ends of the adjoining sections 14 when the handle is to be lengthened. The sections 13 and 14 are preferably about six feet in length so that the length of the tree may be roughly calculated by the operator. The head 10 supports two longitudinally disposed rods 16 and 17 which are arranged in parallel and which are joined at their outer extremities by the cross rods 18 and 19. The entire length of the device is about five feet from the rod 18 to the rod 19. Slidably disposed upon the rods are two pairs of spaced blocks 20 and 21, each pair being spaced about one foot and held in fixed relation to each other by cross members 22 and 23. The members 22 and 23 are held yieldably at the outer ends of the rods 16 and 17 by suitable springs 24 and 25 which are supported between the rods 18 and 19 and the inner blocks 20 and 21, the springs 24 and 25 being positioned on the back of the device. For the purpose of drawing the members 22 and 23 towards the center, cords 26 are secured to the inner blocks 20 and 21 and are passed over pulleys 27 disposed upon the back of the head 10 and are then passed downwardly to the operator. Upon the outer faces of the sliding members 22 and 23 channels 28 are formed, into which are fitted the gage arms 29. The gage arms 29 comprise a shank portion 30 which is adapted to be engaged in the channels 28 and secured therein by set screws 31. The gage arms 29 forwardly extend from the inner ends of the shanks 30 for the purpose of engaging the sides of the tree 15. The sliding member 22 carries upon its outer face an arm 32 which is provided upon its under surface with a scale 33 and which extends centrally from the member 22 being engaged between suitable guides 34 disposed upon the outer face of the opposite sliding member 23. The guides 34 also indicate upon the scale 33 the distance the gage arms 29 are separated from one another.

A tree of great dimensions is measured by loosening the set screws 31 and withdrawing the shanks 30 from the channels 28 and inserting the shanks 30 oppositely in the channels 28 and then securing the same in the channels 20 by the set screws 31. As the sliding members 22 and 23 are each one foot long it will be necessary to add their lengths to the distance marked upon the scale 33 to determine the diameter of the tree 15.

In operation, the cord 26 is released and the device is placed against the tree 15 allowing the arms 29 to be disposed on opposite sides of the tree 15. The device is supported upon the handle 12 which can be lengthened to any desired length by the addition of sections 13 and 14. The height of the tree 15 can be approximated by the length of the handle as the sections are preferably six feet in length.

The dimensions set forth in this specification form no part of the invention but simply illustrate that the device is to be of standard dimensions for the purpose of the ready calculation of the operator.

When the device is raised to the required height the cord 26 is drawn and the sliding members 22 and 23 are moved centrally toward the head 10 until the gage arms 29 engage the sides of the tree 15. During the sliding movement of the members 22 and 23 the arm 32 is also operated sliding through the guides 34 and marking on the scale 33 the distance between the arms 29. The scale 33 is so marked that it can easily be read from an observer at the foot of the tree 15.

As before described when a tree of large diameter is to be measured the arms 29 are inserted in the channels 28 in the opposite direction thus disposing the arms 29 at the outer ends of the sliding members 22 and 23 at a distance of two feet further apart. The scale reading is taken and to it is added the extra two feet thus enabling the instrument to measure the diameter of trees equal to the total length of the rods 16 and 17. In the measurement, the thickness of the bark upon the tree 15 must be taken into consideration.

What is claimed is:—

1. A device for measuring the diameter of trees, comprising a head, rods supported upon said head, sliding members carried by said rods, means for actuating said sliding members along said rods, arms disposed upon said members and a handle for engaging said head and adapted to support said device.

2. A measuring instrument comprising a head, rods on said head, sliding members on said rods, springs for tensionally holding said members outwardly upon said rods, cords to actuate said members at times against the tension of said springs, detachable arms carried by said members, a scale carried by said members, adapted to denote the distances between said arms, and a sectional handle adapted to support said head.

In testimony whereof I affix my signature, in presence of two witnesses.

JOHN J. JONES.

Witnesses:
 L. W. BETHURUM,
 ANNA E. MILLER.